US011146371B2

(12) United States Patent
Kakishima et al.

(10) Patent No.: US 11,146,371 B2
(45) Date of Patent: Oct. 12, 2021

(54) METHOD OF TRANSMISSION OF CSI-RS AND BASE STATION

(71) Applicants: DOCOMO INNOVATIONS, INC., Palo Alto, CA (US); NTT DOCOMO, INC., Tokyo (JP)

(72) Inventors: Yuichi Kakishima, Tokyo (JP); Satoshi Nagata, Tokyo (JP); Chongning Na, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 280 days.

(21) Appl. No.: 16/090,481

(22) PCT Filed: Mar. 30, 2017

(86) PCT No.: PCT/US2017/024906
§ 371 (c)(1),
(2) Date: Oct. 1, 2018

(87) PCT Pub. No.: WO2017/173023
PCT Pub. Date: Oct. 5, 2017

(65) Prior Publication Data
US 2020/0336259 A1    Oct. 22, 2020

Related U.S. Application Data

(60) Provisional application No. 62/316,261, filed on Mar. 31, 2016.

(51) Int. Cl.
*H04W 4/00* (2018.01)
*H04L 5/00* (2006.01)
*H04B 7/0417* (2017.01)

(52) U.S. Cl.
CPC ......... *H04L 5/005* (2013.01); *H04B 7/0417* (2013.01); *H04L 5/0023* (2013.01)

(58) Field of Classification Search
None
See application file for complete search history.

(56) References Cited

U.S. PATENT DOCUMENTS

| | | | | |
|---|---|---|---|---|
| 2015/0117350 | A1* | 4/2015 | Seo | H04L 5/0048 |
| | | | | 370/329 |
| 2015/0244508 | A1* | 8/2015 | Kim | H04L 5/0023 |
| | | | | 370/329 |

(Continued)

FOREIGN PATENT DOCUMENTS

| | | |
|---|---|---|
| JP | 2015-70335 A | 4/2015 |
| JP | 2019-91956 A | 6/2019 |
| WO | 2017/152730 A1 | 9/2017 |

OTHER PUBLICATIONS

Office Action in counterpart Japanese Patent Application No. 2018-551396 dated Dec. 10, 2019 (18 pages).

(Continued)

*Primary Examiner* — Phirin Sam
(74) *Attorney, Agent, or Firm* — Osha Bergman Watanabe & Burton LLP

(57) ABSTRACT

A method of transmission of Channel State Information Reference Signals (CSI-RSs) includes transmitting, from a base station (BS) to a user equipment (UE), the CSI-RSs using 24 antenna ports (APs) or 32 APs. A first CSI-RS configuration for the APs are configured by aggregating a predetermined number of second CSI-RS configurations. A number of APs per each of the second CSI-RS configurations is 2, 4, or 8.

8 Claims, 14 Drawing Sheets

(56) References Cited

U.S. PATENT DOCUMENTS

| | | | | |
|---|---|---|---|---|
| 2015/0257132 | A1* | 9/2015 | Park | H04W 72/042 |
| | | | | 370/329 |
| 2016/0143055 | A1* | 5/2016 | Nammi | H01Q 21/28 |
| | | | | 370/329 |
| 2017/0180194 | A1* | 6/2017 | Noh | H04L 5/0048 |
| 2018/0054290 | A1* | 2/2018 | Park | H04L 5/005 |
| 2018/0198586 | A1* | 7/2018 | Yoon | H04L 5/0026 |
| 2018/0278437 | A1* | 9/2018 | Davydov | H04B 7/0456 |
| 2019/0181936 | A1* | 6/2019 | Park | H04L 5/0048 |
| 2020/0127797 | A1* | 4/2020 | Yoon | H04B 7/0413 |

OTHER PUBLICATIONS

Samsung; "New WID roposal: Enhancements on Full-Dimension (FD) MIMO for LTE"; 3GPP TSG RAN Meeting #71, RP-160212; Göteborg, Sweden; Mar. 7-10, 2016 (8 pages).

International Preliminary Report on Patentability for corresponding International Application No. PCT/US2017/024906, dated Oct. 2, 2018 (11 pages).

International Search Report for corresponding International Application No. PCT/US2017/024906, dated Oct. 17, 2017 (6 pages).

Written Opinion for corresponding International Application No. PCT/US2017/024906, dated Oct. 9, 2017 (11 pages).

3GPP TS 36.211 V.13.1.0; "3rd Generation Partnership Project; Technical Specification Group Radio Access Network; Evolved Universal Terrestrial Radio Access (E-UTRA); Physical channels and modulation (Release 13)"; Mar. 2016 (155 pages).

3GPP TS 36.213 V13.1.0; "3rd Generation Partnership Project; Technical Specification Group Radio Access Network; Evolved Universal Terrestrial Radio Access (E-UTRA); Physical layer procedures (Release 13)"; Mar. 2016 (361 pages).

Samsung; "New WID Proposal: Enhancements on Full-Dimension (FD) MIMO for LTE", 3GPP Draft; RP-160212; 3GPP RAN WG1 Meeting #71; Göteborg, Sweden; Mar. 7-10, 2016 (8 pages).

Samsung; "Discussion on CSI-RS mapping for non-precoded CSI-RS based schemes"; 3GPP Draft; R1-152893; 3GPP RAN WG1 Meeting #81; Fukuoka, Japan; May 25-29, 2015 (4 pages).

Catt; "High-level design principles for CSI-RS enhancements"; 3GPP Draft, R1-153932; 3GPP TSG RAN WG1 Meeting #82; Beijing, P.R. China; Aug. 24-28, 2015 (4 page).

Qualcomm Incorporated; "Non-precoded CSI-RS design for CSI reporting class A"; 3GPP Draft; R1-155735; 3GPP TSG RAN WG1 Meeting #82bis; Malmö, Sweden; Oct. 5-9, 2015 (5 page).

Qualcomm Incorporated; "Enhancements on Non-precoded CSI-RS for eFD-MIMO"; 3GPP Draft; R1-163038; 3GPP TSG RAN WG1 Meeting #84bis; Busan, Korea; Apr. 11-158, 2016 (4 page).

Office Action issued in the counterpart Japanese Patent Application No. 2018-551396, dated Jul. 7, 2020 (10 pages).

ZTE; "Extension of Non-Precoded CSI-RS for 12 and 16 Ports"; 3GPP TSG RAN WG1 Meeting #82bis, R1-155263; Malmö, Sweden, Oct. 5-9, 2015 (6 pages).

Office Action issued in the counterpart Japanese Patent Application No. 2018-551396, dated Oct. 20, 2020 (7 pages).

Office Action issued in the counterpart European Patent Application No. 17718186.4, dated May 4, 2021 (7 pages).

\* cited by examiner

FIG. 4

| Total number of antenna ports | Number of CSI-RS antenna ports per CSI-RS configuration $N_P$ | Number of CSI-RS configurations $N_R$ |
|---|---|---|
| 20 | 4 | 5 |
| 24 | 8 | 3 |
| 28 | 4 | 7 |
| 32 | 8 | 4 |

FIG. 5

| Total number of antenna ports | Unused resource elements | Number of CSI-RS antenna ports per CSI-RS configuration $N_P$ | Number of CSI-RS configurations $N_R$ |
|---|---|---|---|
| 20 | 20 | 4 | 5 |
| 24 | 16 | 8 | 2 |
| 28 | 12 | 4 | 3 |
| 32 | 8 | 4 | 2 |

FIG. 6

| Total number of antenna ports | Number of CSI-RS antenna ports per CSI-RS configurations $N_P$ | Number of CSI-RS configurations $N_R$ |
|---|---|---|
| 20 | 2 | 5 |
| 24 | 4 | 3 |
| 28 | 2 | 7 |
| 32 | 8 | 2 |

CSI-RS APs (24-Tx CSI-RS) configuration

CSI-RS is transmitted from APs of antenna port numbers {15, ..., 26}.
CSI-RS is not transmitted from APs of antenna port numbers {27, ..., 38}.

CSI-RS APs configuration

✖: Sampled AP(s)
✕: Not sampled APs

METHOD OF TRANSMISSION OF CSI-RS AND BASE STATION

TECHNICAL FIELD

The present invention relates generally to wireless communication methods and, more particularly, to a Channel State Information Reference Signal (CSI-RS) transmission using multiple CSI-RS antenna ports in a wireless communication system.

BACKGROUND ART

Long Term Evolution (LTE) Release 13 (Rel. 13 LTE), standardized by the Third Generation Partnership Project (3GPP), supports CSI-RS antenna ports (APs) up to 16.

Rel. 12 LTE supports the numbers {1, 2, 4, 8} of the CSI-RS APs (1, 2, 4, 8-Tx CSI-RS) with one resource element (RE) per resource block (RB) per antenna port (1 RE/RB/port) and power boosting with code division multiplexing (CDM)-2. FIG. 1 is a diagram showing a CSI-RS resource configuration of 2, 4, 8-Tx CSI-RS for Rel. 12 LTE. As shown in FIG. 1, one axis designates OFDM symbols and the other axis designates subcarriers. Each block corresponds to the RE in the RB and the hatched REs with the antenna ports number are allocated to the CSI-RS APs. Thus, in Rel. 12 LTE, the CSI-RSs are transmitted on 1, 2, 4, 8 APs using the antenna port number p=15, p=15, 16, p=15, ..., 18, p=15, ..., 22, respectively.

Rel. 13 LTE supports the numbers {1, 2, 4, 8, 12, 16} of the CSI-RS APs (1, 2, 4, 8, 12, 16-Tx CSI-RS) with one RE per RB per AP (1 RE/RB/port) and power boosting with CDM-2 and CDM-4. FIG. 2 is a diagram showing a CSI-RS resource configuration of 12, 16-Tx CSI-RS for Rel. 13 LTE. As shown in FIG. 2, like FIG. 1, one axis designates OFDM symbols and the other axis designates subcarriers. Each block corresponds to the RE in the RB and the hatched REs with the antenna ports number are allocated to the CSI-RS APs. Thus, in Rel. 13 LTE, the CSI-RSs are transmitted on 1, 2, 4, 8, 12, 16 APs using the antenna port number p=15, p=15, 16, p=15, ..., 18, p=15, ..., 22, p=15, ..., 26, p=15, ..., 30, respectively.

Furthermore, the CSI-RS resource for Rel. 13 LTE is configured by aggregating multiple CSI-RS configurations for Rel. 12 LTE within the same RB per subframe. For example, as shown in FIG. 2, the CSI-RS resource of 12-Tx CSI-RS (CDM-2) for Rel. 13 LTE is configured by aggregating three CSI-RS configurations of 4-Tx CSI-RSs for Rel. 12 LTE. In FIG. 2, $N_P$ represents the number of CSI-RS antenna ports per CSI-RS configuration and $N_R$ represents the number of CSI-RS configurations. That is, total number of antenna ports is obtained by $N_P N_R$. In other words, the CSI-RS resource of 12-Tx CSI-RS is defined as $(N_P, N_R)$= (4, 3). On the other hand, the CSI-RS resource of 16-Tx CSI-RS (CDM-2) for Rel. 13 LTE is configured by aggregating two CSI-RS configurations of 8-Tx CSI-RSs for Rel. 12 LTE. The CSI-RS resource of 16-Tx CSI-RS is defined as $(N_P, N_R)$=(8, 2).

In 3GPP, enhanced Full Dimension-Multiple Input Multiple Output (eFD-MIMO) is being studied under Rel. 14 LTE. For example, extending the existing numbers {1, 2, 4, 8, 12, 16} of CSI-RS APs to {20, 24, 28, 32} of CSI-RS APs is expected in a eFD-MIMO technology. However, a CSI-RS configuration for the extension to {20, 24, 28, 32} of CSI-RS APs is not defined under Rel. 14 LTE. Furthermore, the extension of CSI-RS APs may cause to increase an overhead for CSI-RS transmission.

CITATION LIST

Non-Patent Reference

Non-Patent Reference 1: 3GPP, TS 36.211 V 13.1.0
Non-Patent Reference 2: 3GPP, TS 36.213 V 13.1.0

SUMMARY OF THE INVENTION

According to one or more embodiments of the present invention, a method of transmission of Channel State Information Reference Signals (CSI-RSs) may comprise transmitting, from a base station (BS) to a user equipment (UE), the CSI-RSs using greater than or equal to 20 antenna ports (APs). A first CSI-RS configuration for the APs may be configured by aggregating a predetermined number of second CSI-RS configurations. A number of APs per each of the second CSI-RS configurations may be 4 or 8.

According to one or more embodiments of the present invention, a method of transmission of CSI-RSs may comprise transmitting, from a BS to a UE, the CSI-RSs with predetermined CSI-RS density using greater than or equal to 20 APs. The predetermined CSI-RS density for at least one of the APs may be different from one CSI-RS REs per RB per each of the APs.

According to one or more embodiments of the present invention, a BS in a wireless communication system may comprise a transmitter that transmits, a UE, CSI-RSs using greater than or equal to 20 APs. A first CSI-RS configuration for the APs may be configured by aggregating a predetermined number of second CSI-RS configurations. A number of APs per each of the second CSI-RS configurations may be 4 or 8.

According to embodiments of the present invention, an increased overhead for CSI-RS transmission with the extension of the CSI-RS APs can be reduced.

BRIEF DESCRIPTION OF THE DRAWINGS

FIG. 4 is a table showing a CSI-RS configuration for Rel. 14 LTE according to one or more embodiments of a first example of the present invention.

FIG. 5 is a table showing a CSI-RS configuration for Rel. 14 LTE according to one or more embodiments of a modified first example of the present invention.

FIG. 6 is a table showing a CSI-RS configuration for Rel. 14 LTE according to one or more embodiments of a second example of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
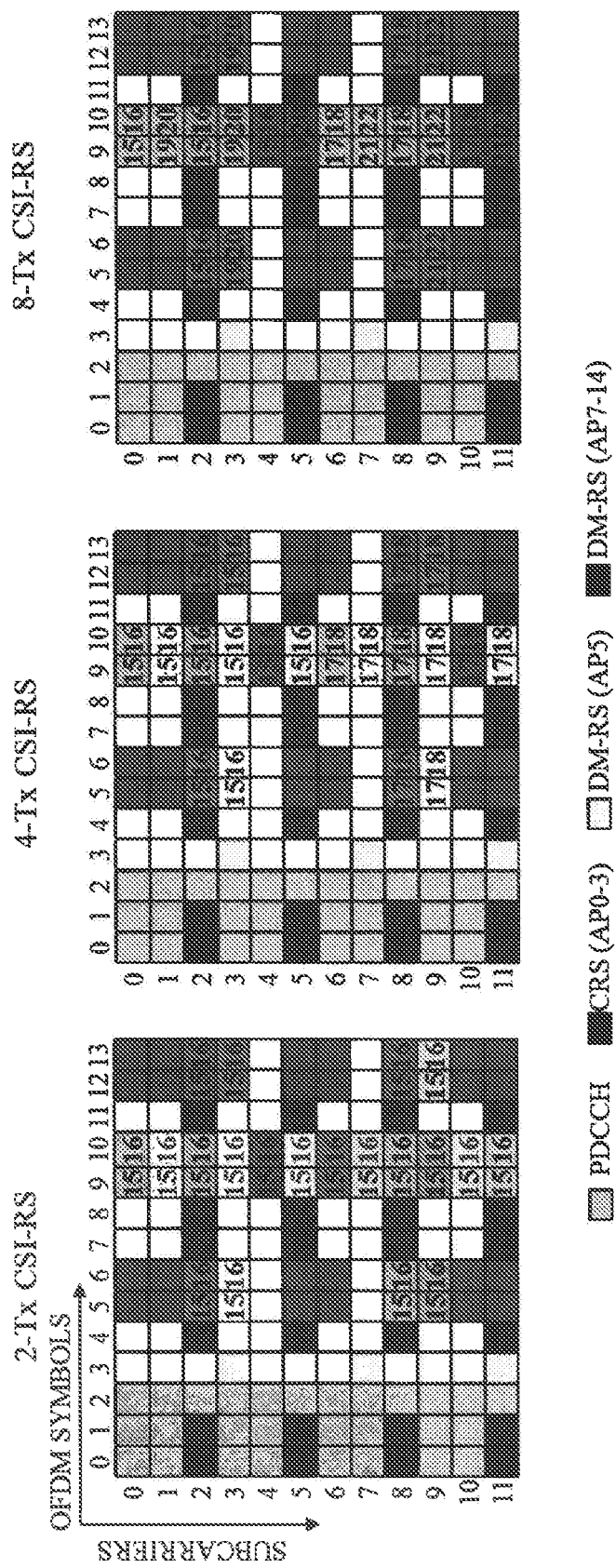
FIG. 1 is a diagram showing a CSI-RS configuration of 2, 4, 8-Tx CSI-RS for Rel. 12 LTE.
Figure 2:
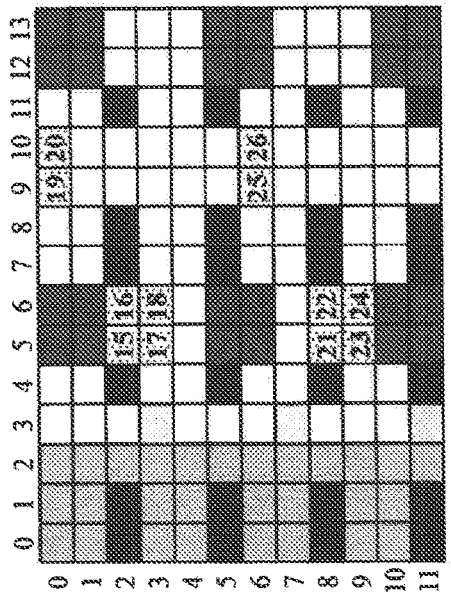
FIG. 2 is a diagram showing a CSI-RS configuration of 12, 16-Tx CSI-RS for Rel. 13 LTE.
Figure 2:
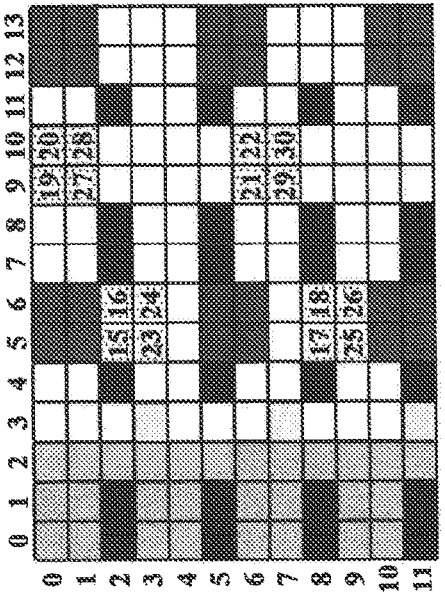
Figure 2:
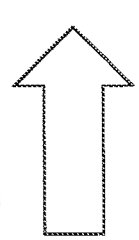
Figure 2:
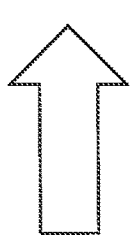
Figure 2:
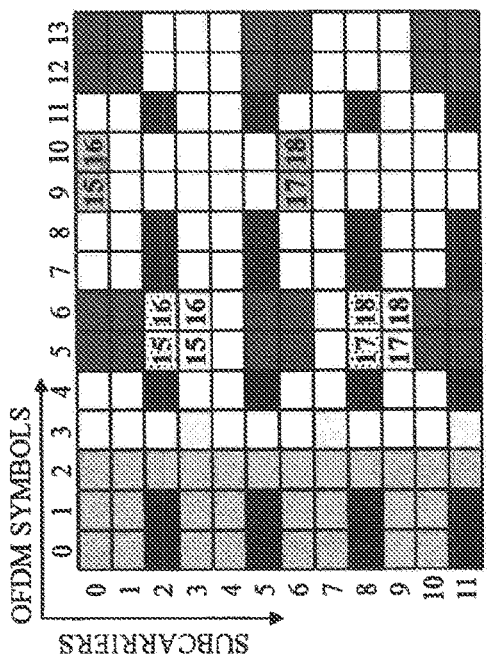
Figure 2:
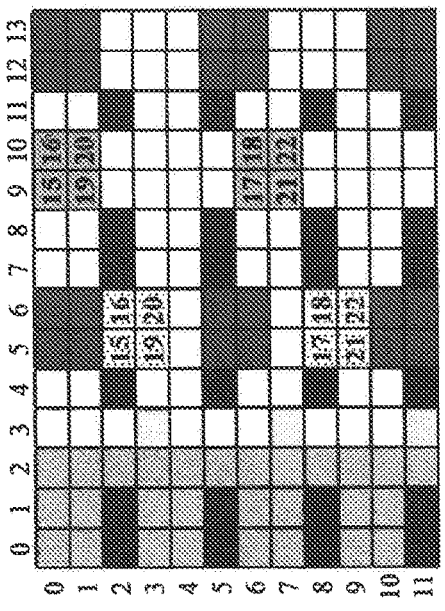
Figure 3:
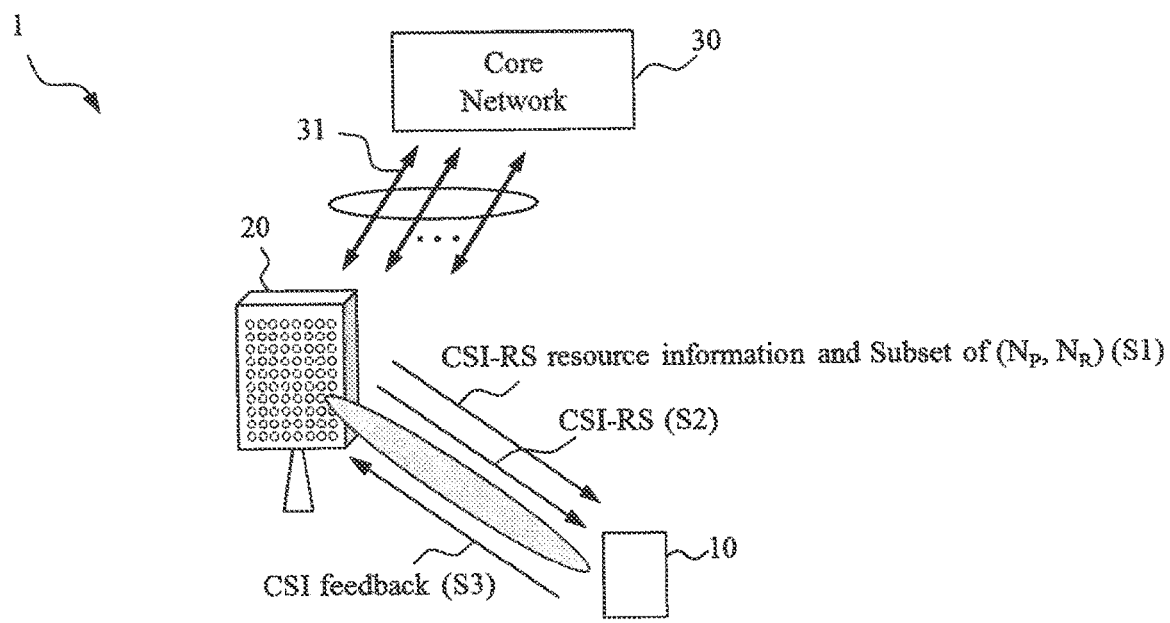
FIG. 3 is a diagram showing a configuration of a wireless communication system according to one or more embodiments of the present invention.

FIG. 3 illustrates a configuration of a wireless communications system according to one or more embodiments of the present invention. The wireless communication system 1 includes a User Equipment (UE) 10, a Base Station (BS) 20, and a core network 30. The wireless communication system 1 may be an LTE/LTE-Advanced (LTE-A) or a New Radio (NR) system supporting FD-MIMO (eFD-MIMO). In the eFD-MIMO, the numbers {1, 2, 4, 8, 12, 16} of Channel State Information Reference Signal (CSI-RS) antenna ports (APs) are extended to the numbers {20, 24, 28, 32} of CSI-RS APs (multiple APs of the BS 20). Therefore, the CSI-RSs may be transmitted on 1, 2, 4, 8, 12, 16, 20, 24, 28, 32 APs using the antenna port number p=15, p=15, 16, p=15, ..., 18, p=15, ..., 22, p=15, ..., 26, p=15, ..., 30, p=15, ..., 34, p=15, ..., 38, p=15, ..., 42, p=15, ..., 46, respectively. The numbers {1, 2, 4, 8, 12, 16, 20, 24, 28, 32} of CSI-RS AP(s) are also referred to as 1, 2, 4, 8, 12, 16, 20, 24, 28, 32-Tx CSI-RS, respectively. For example, the number of CSI-RS APs may not be greater than 32. The wireless communication system 1 is not limited to the specific configurations described herein and may be any type of wireless communication system supporting the CSI-RS transmission. The wireless communication system 1 may include a plurality of UEs 10 and BSs 20.

The BS 20 may communicate uplink (UL) and downlink (DL) signals with the UE 10 in a coverage area via multiple APs using MIMO technology. The DL and UL signals include control information and user data. The BS 20 may communicate DL and UL signals with the core network 30 through backhaul links 31. The BS 20 may be Evolved NodeB (eNB) or a base station for the NR system (e.g., gNodeB (gNB)).

The BS 20 includes an antenna for MIMO, a communication interface to communicate with an adjacent BS 20 (for example, X2 interface), a communication interface to communicate with the core network 30 (for example, S1 interface), and a CPU (Central Processing Unit) such as a processor, controller, or a circuit to process transmitted and received signals with the UE 10. Operations of the BS 20 described below may be implemented by the processor processing or executing data and programs stored in a memory. However, the BS 20 is not limited to the hardware configuration set forth above and may be realized by other appropriate hardware configurations as understood by those of ordinary skill in the art. Generally, a number of the BSs 20 are disposed so as to cover a broader service area of the wireless communication system 1.

The UE 10 communicates DL and UL signals that include control information and user data with the BS 20 using MIMO technology. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

The CSI-RS and CSI feedback process according to one or more embodiments of the present invention will be described below. As shown in FIG. 3, the BS 20 may transmit CSI-RS resource information and a subset of ($N_P$, $N_R$) to the UE 10 (step S1). $N_P$ represents the number of CSI-RS antenna ports (APs) per CSI-RS configuration. $N_R$ represents the number of CSI-RS configurations. The CSI-RS configuration is defined as a set of resource elements (REs) associated with the CSI-RS APs (in the subset). The CSI-RS configuration may be referred to as a CSI-RS resource. In one or embodiments of the present invention, the number of the CSI-RS APs in the subset per the CSI-RS configuration ($N_P$) is less than or equal to the number of the CSI-RS APs that is multiple APs of the BS 20. Then, the BS 20 may transmit the CSI-RS using REs associated with the CSI-RS APs based on the subset of ($N_P$, $N_R$) to the UE 10 (step S2). The UE 10 may obtain the CSI-RS from the BS 20 using the CSI-RS configuration and the subset of ($N_P$, $N_R$) for DL CSI measurement. Then, the UE 10 may transmit CSI feedback information including the CSI to the BS 20 (step S3).

FIRST EXAMPLE

Embodiments of a first example of the present invention will be described below. The legacy LTE standard such as Rel. 13 LTE does not define the CSI-RS configuration for the extension to {20, 24, 28, 32} of CSI-RS APs. A method for CSI-RS resource allocation according to one or more embodiments of a first example of the present invention can realize the CSI-RS configuration corresponding to the extension of the CSI-RS APs which is not defined in the legacy LTE standard.

According to one or more embodiments of the first example of the present invention, when the BS 20 transmit the CSI-RSs using greater than or equal to 20 APs, a CSI-RS configuration (first CSI-RS configuration) for the APs may be configured by aggregating the predetermined number of CSI-RS configurations (second CSI-RS configurations). For example, the CSI-RS configurations for 20, 24, 28, 32-Tx CSI-RS may be configured by aggregating the predetermined number of legacy CSI-RS configurations by the BS 20. For example, the CSI-RS configurations of 20, 24, 28, 32-Tx CSI-RS are configured by aggregating by CSI-RS configurations of Rel. 12 LTE and/or CSI-RS configurations of Rel. 13 LTE.

For example, the CSI-RS configuration of 20-Tx CSI-RS may be configured by aggregating five CSI-RS configurations of 4-Tx CSI-RS of Rel. 12 LTE. The CSI-RS configuration of 20-Tx CSI-RS is also defined as ($N_P$, $N_R$)=(4, 5). Similarly, for example, the CSI-RS configurations of 20, 24, 28, 32-Tx CSI-RS may be defined as the subset (one, some or all) of ($N_P$, $N_R$), as described below:

($N_P$, $N_R$)=(2, 10), (4, 5) for the CSI-RS configuration of 20-Tx CSI-RS;
($N_P$, $N_R$)=(2, 12), (4, 6), (8, 3), (12, 2) for the CSI-RS configuration of 24-Tx CSI-RS;
($N_P$, $N_R$)=(2, 14), (4, 7) for the CSI-RS configuration of 28-Tx CSI-RS; and
($N_P$, $N_R$)=(2, 16), (4, 8), (8, 4), (16, 2) for the CSI-RS configuration of 32-Tx CSI-RS.

For the simplification, in embodiments of the first example of the present invention, the CSI-RS configuration for Rel. 14 LTE such as 20, 24, 28, 32-Tx CSI-RS may be configured by aggregating the CSI-RS configuration of Rel. 12 LTE with largest $N_P$ as shown in FIG. 4.

Thus, according to one or more embodiments of the first example of the present invention, the BS 20 may determine the CSI-RS configuration (first CSI-RS configuration) for greater than or equal to 20 APs (e.g., 20, 24, 28, 32 APs) by aggregating $N_R$ CSI-RS configurations (second CSI-RS configurations). $N_R$ (the predetermined number of the second CSI-RS configurations) for 20, 24, 28, and 32 APs may be 5, 3, 7, and 4, respectively, as shown in FIG. 4. For example, when 20 and 28 APs are used for the CSI-RS transmission, the number of APs per each of the CSI-RS configurations is 4. When 24 and 32 APs are used for the CSI-RS transmission, the number of APs per each of the CSI-RS configurations is 8. Then, the BS 20 may transmit the CSI-RS configured with the determined CSI-RS configuration using the APs (20, 24, 28, or 32 APs) to the UE 10. Furthermore, the $N_P$ may be less than the number of the multiple APs. Therefore, the CSI-RS configuration for 20, 24, 28, 32-Tx CSI-RS can be configured and the CSI-RSs may be properly transmitted using the configured CSI-RS configuration for 20, 24, 28, 32-Tx CSI-RS.

MODIFIED FIRST EXAMPLE

The maximum number of REs associated with the CSI-RS APs per subframe (CSI-RS REs) is 40 according to the LTE standard. On the other hand, for example, REs associated with 20, 24, 28, and 32-Tx CSI-RS are large. According to one or more embodiments of a modified first example of the present invention, the CSI-RS configuration of 20, 24, 28, and 32-Tx CSI-RS may be determined by designating unused REs of REs allocable to the CSI-RS APs (40 REs) by the BS 20. The unused REs may be not associated with the CSI-RS APs.

According to one or more embodiments of the modified first example of the present invention, for example, the subset of ($N_P$, $N_R$) to configure the CSI-RS configuration of 20, 24, 28, and 32-Tx CSI-RS are as follows:

($N_P$, $N_R$)=(2, 10), (4, 5) for the CSI-RS configuration of 20-Tx CSI-RS;
($N_P$, $N_R$)=(2, 8), (4, 4), (8, 2) for the CSI-RS configuration of 24-Tx CSI-RS;
($N_P$, $N_R$)=(2, 6), (4, 3) for the CSI-RS configuration of 28-Tx CSI-RS; and
($N_P$, $N_R$)=(2, 4), (4, 2) for the CSI-RS configuration of 32-Tx CSI-RS.

For the simplification, in embodiments of the modified first example of the present invention, the CSI-RS configuration for Rel. 14 LTE such as 20, 24, 28, 32-Tx CSI-RS may be configured by aggregating the CSI-RS configurations of Rel. 12 LTE with largest $N_P$ as shown in FIG. 5.

Furthermore, one bit (e.g., CSI-RS-Flag) to indicate whether the configured CSI-RS is used or unused may be introduced to information transmitted from the BS 20 to the UE 10. For example, when the subset of ($N_P$, $N_R$)=(8, 2) is set, if CSI-RS-Flag=1, the subset indicates REs associated with the CSI-RS APs, therefore, the UE 10 determines the number of CSI-RS APs is 16. On the other hand, if CSI-RS-Flag=0, the subset indicates unused CSI-RS, therefore, the UE 10 determines the number of CSI-RS APs is 24 (16 subtracted from 40).

Thus, according to one or more embodiments of a first example of the present invention, the subset of ($N_P$, $N_R$) may indicate REs that is not associated with the multiple APs.

SECOND EXAMPLE

Embodiments of a second example of the present invention will be described below. The extension of CSI-RS APs (20, 24, 28, 32-Tx CSI-RS) may cause to increase an overhead for CSI-RS transmission. On the other hand, CSI-RS density for the legacy LTE standard (e.g., Rel. 13 LTE) is one CSI-RS RE per RB per AP (1 RE/RB/port). The CSI-RS RE is an RE associated with the CSI-RS.

According to one or more embodiments of the second example of the present invention, the CSI-RS density may be varied from 1 RE/RB/port. For example, in Rel. 14 LTE that supports the CSI-RS transmission using a large number of APs (e.g., 20, 24, 28, 32-Tx CSI-RS), the CSI-RS density may be reduced. On the other hand, for example, the CSI-RS density may be increased to increase channel estimation accuracy of the CSI-RS, time/frequency tracking, and quasi-colocation.

According to one or more embodiments of the second example of the present invention, the CSI-RS density may be equally reduced for all the APs to be less than 1 RE/RB/port. For example, the CSI-RS density for 20, 24, 28, 32-Tx CSI-RS may be one-half of 1 RE/RB/port (0.5 RE/RB/port). For example, in the CSI-RS with the reduced CSI-RS density, the CSI-RS density for 24-Tx CSI-RS for Rel. 14 LTE may be the same as the CSI-RS density for 12-Tx CSI-RS for the legacy LTE standard.

For example, when the CSI-RS density for 20, 24, 28, 32-Tx CSI-RS is 0.5 RE/RB/port, the subset of $(N_P, N_R)$ may be:
- $(N_P, N_R)$=(2, 5) for the CSI-RS configuration of 20-Tx CSI-RS;
- $(N_P, N_R)$=(2, 6), (4, 3) for the CSI-RS configuration of 24-Tx CSI-RS;
- $(N_P, N_R)$=(2, 7) for the CSI-RS configuration of 28-Tx CSI-RS; and
- $(N_P, N_R)$=(2, 8), (4, 4), (8, 2) for the CSI-RS configuration of 32-Tx CSI-RS.

It may be advantageous to reuse the pattern of 12, 16-Tx CSI-RS to determine the subset for the CSI-RS configuration of 24, 32-Tx CSI-RS, respectively.

For the simplification, in one or more embodiments of the second example of the present invention, when the CSI-RS density is reduced, the subset of $(N_P, N_R)$ for the CSI-RS configuration for Rel. 14 LTE such as 20, 24, 28, 32-Tx CSI-RS may be configured with largest $N_P$ as shown in FIG. 6.

Figure 7A:
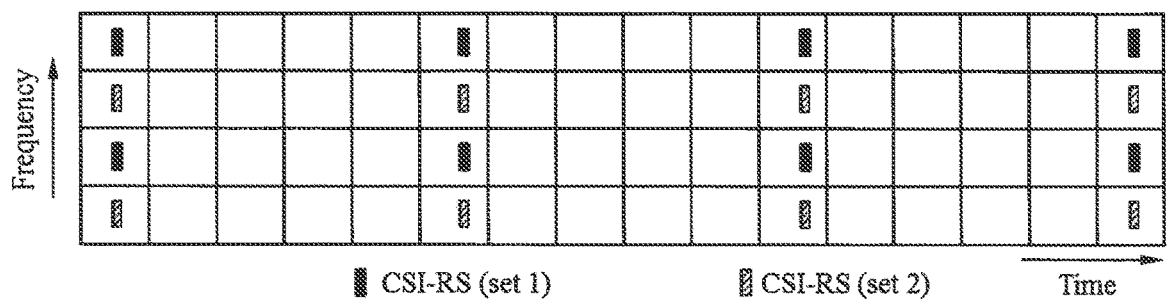
FIG. 7A is a diagram showing CSI-RS transmission to which Frequency Division Multiplexing (FDM) is applied according to one or more embodiments of the second example of the present invention.
Figure 7B:
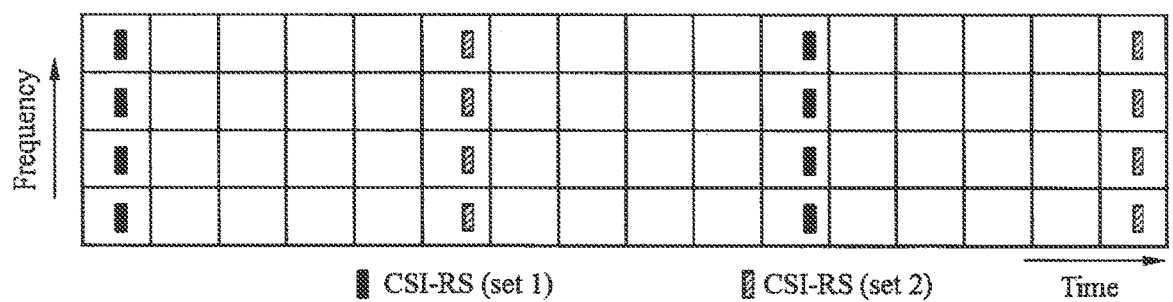
FIG. 7B is a diagram showing CSI-RS transmission to which TDM is applied according to one or more embodiments of the second example of the present invention.
Figure 7C:
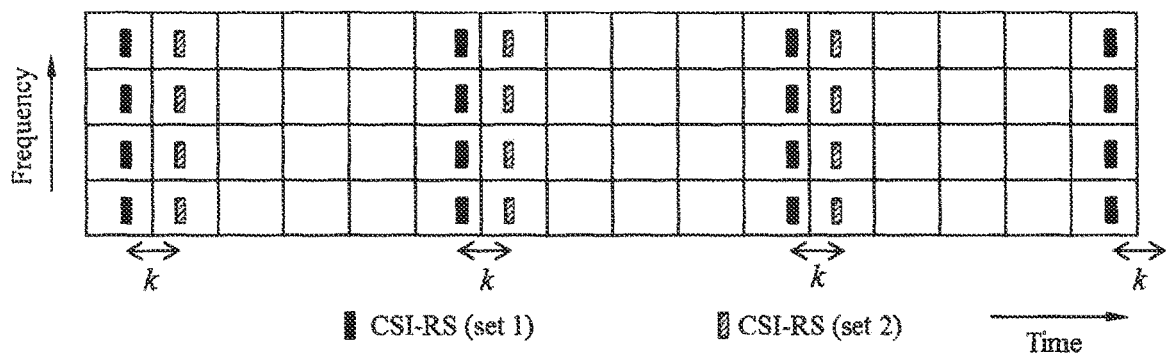
FIG. 7C is a diagram showing CSI-RS transmission to which TDM is applied according to one or more embodiments of the second example of the present invention.
Figure 7D:
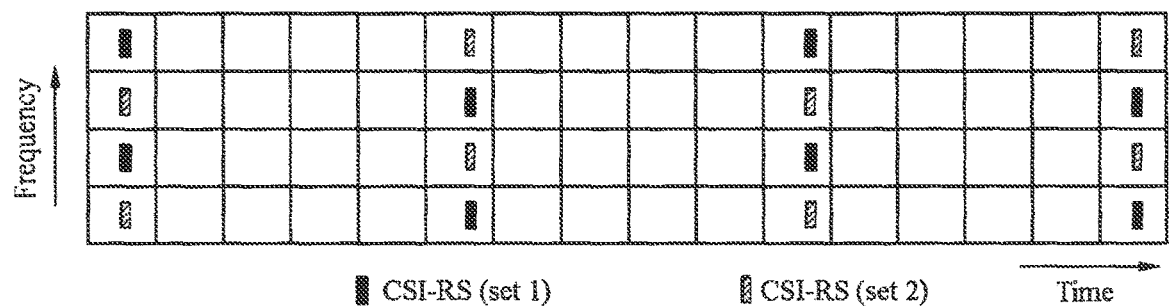
FIG. 7D is a diagram showing CSI-RS transmission to which FDM and TDM are applied according to one or more embodiments of the second example of the present invention.
Figure 7E:
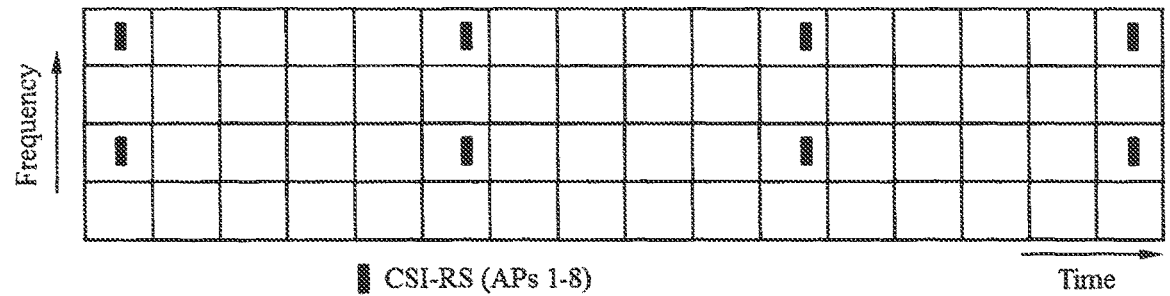
FIG. 7E is a diagram showing CSI-RS transmission to which FDM are applied according to one or more embodiments of the second example of the present invention.

In one or more embodiments of the second example of the present invention, when the BS 20 transmits the CSI-RS with the lower CSI-RS density, for example, as shown in FIGS. 7A, 7B, 7C, 7D, and 7E, at least one of Frequency Division Multiplexing (FDM) and Time Division Multiplexing (TDM) may be applied (e.g., with a reuse factor of 2 or a parameter of density such as 0.5) to the CSI-RS transmission. FIG. 7A illustrates CSI-RS transmission to which the FDM is applied. FIGS. 7B and 7C illustrate CSI-RS transmission to which the TDM is applied. FIG. 7D illustrates CSI-RS transmission to which the TDM and FDM are applied. For example, a FDM reuse factor and a TDM reuse factor may be introduced as a Radio Resource Control (RRC) parameter. In FIG. 7C, the offset timing, k, may be introduced as a RRC parameter. It can be predetermined in the specification, e.g., k=1, −1, etc. FIG. 7E is a diagram showing a CSI-RS configuration for 8-Tx CSI-RS. As shown in FIG. 7E, the CS-RS resource is configured with the FDM (comb-type structure) and the CSI-RS REs are arranged and hopped in a frequency direction.

Thus, according to one or more embodiments of the second example of the present invention, the BS 20 may transmit, to the UE 10, the CSI-RSs with predetermined CSI-RS density using greater than or equal to 20 APs (e.g., 20, 24, 28, or 32 APs). The predetermined CSI-RS density for at least one of the APs may be different from one CSI-RS REs per RB per each of the APs. For example, the predetermined CSI-RS density may be less than one CSI-RS RE per RB per each of the APs such as 0.5 CSI-RS RE/PB/AP. As a result, an increased overhead for CSI-RS transmission with the port extension such as 20, 24, 28, 32-Tx CSI-RS can be reduced.

THIRD EXAMPLE

Embodiments of a third example of the present invention will be described below. According to one or more embodiments of the third example of the present invention, the CSI-RS density for a part of APs may be reduced or increased. That is, the CSI-RS density for each AP may be different from each other. For example, the CSI-RS density for a part of the APs (which is covered by Rel. 13 LTE) may be higher density (e.g., 1 RE/RB/port) and the CSI-RS density for the other part of the APs may be lower density (e.g., 0.5 RE/RB/port). For example, the CSI-RS density for 16 APs covered by Rel. 13 LTE of 20-Tx CSI-RS may be 1 RE/RB/port and the CSI-RS density for remaining 4 APs may be 0.5 RE/RB/port. In such case, same channel estimation algorithm can be reused up to 16 APs. It may be beneficial considering backward compatibility.

According to one or more embodiments of the third example of the present invention, for example, when the CSI-RS density for a part of the APs of 20, 24, 28, 32-Tx CSI-RS is 1 RE/RB/port and the CSI-RS density for the other part of the APs is 0.5 RE/RB/port, the subset of $(N_P, N_R)$ may be:
- $(N_P, N_R)$=(8, 2)+(2, 1) for the CSI-RS configuration of 20-Tx CSI-RS;
- $(N_P, N_R)$=(8, 2)+(4, 1) for the CSI-RS configuration of 24-Tx CSI-RS;
- $(N_P, N_R)$=(8, 2)+(2, 3) for the CSI-RS configuration of 28-Tx CSI-RS; and
- $(N_P, N_R)$=(8, 2)+(4, 2) for the CSI-RS configuration of 32-Tx CSI-RS.

In the above example of the subset for the CSI-RS configuration of 20-Tx CSI-RS, the subset of (8, 2) indicates the CSI-RS configuration of which the CSI-RS density is 1 RE/RB/port and the subset of (2, 1) indicates the CSI-RS configuration of which the CSI-RS density is 0.5 RE/RB/port. That is, when $(N_P, N_R)$ is (8, 2)+(2, 1) for the CSI-RS configuration of 20-Tx CSI-RS, the CSI-RS density is $[(8\times2)+(2\times1)]/20$ (=18/20) RE/RB/port. Similarly, when $(N_P, N_R)$ is (8, 2)+(4, 1) for the CSI-RS configuration of 24-Tx CSI-RS, the CSI-RS density is 20/24 RE/RB/port. When $(N_P, N_R)$ is (8, 2)+(2, 3) for the CSI-RS configuration of 28-Tx CSI-RS, the CSI-RS density is 22/28 RE/RB/port. When $(N_P, N_R)$ is (8, 2)+(4, 2) for the CSI-RS configuration of 32-Tx CSI-RS, the CSI-RS density is 24/32 RE/RB/port.

As another example, according to one or more embodiments of the third example of the present invention, for example, when the CSI-RS density is 18/20, 20/24, 22/28, 24/32 RE/RB/port in above example, the subset of $(N_P, N_R)$ corresponding thereto, respectively, may be:
- $(N_P, N_R)$=(2,9) of 18-Tx CSI-RS;
- $(N_P, N_R)$=(2,10) or (4,5) of 20-Tx CSI-RS;
- $(N_P, N_R)$=(2,11) of 22-Tx CSI-RS; and
- $(N_P, N_R)$=(2,12) or (4, 6) of 24-Tx CSI-RS.

Thus, the subset of $(N_P, N_R)$ may be configured as a single subset instead of a combination of a plurality of subsets.

As one or more embodiments of another example of the third example of the present invention, for example, the CSI-RS density for 10 APs having one polarization of 20-Tx CSI-RS may be higher density (e.g., 1 RE/RB/port) and the CSI-RS density for remaining 10 APs having the other polarization may be lower density. For example, when the CSI-RS density for half of 20, 24, 28, 32-Tx CSI-RS is 1 RE/RB/port and the CSI-RS density for the other half is lower density (e.g., 0.5 RE/RB/port), the subset of $(N_P, N_R)$ may be:
- $(N_P, N_R)$=(2, 5)+(2, 3) for the CSI-RS configuration of 20-Tx CSI-RS;
- $(N_P, N_R)$=(4, 3)+(2, 3) for the CSI-RS configuration of 24-Tx CSI-RS;

$(N_P, N_R) = (2, 7) + (4, 2)$ for the CSI-RS configuration of 28-Tx CSI-RS; and $(N_P, N_R) = (8, 2) + (4, 2)$ for the CSI-RS configuration of 32-Tx CSI-RS.

In the above example of the subset for the CSI-RS configuration of 20, 28-Tx CSI-RS, one AP, e.g., last AP of the subset of (2, 3), (4, 2) can be discarded. Furthermore, the subset of $(N_P, N_R)$ may be configured as a single subset instead of a combination of a plurality of subsets, as described above.

Furthermore, according to one or more embodiments of another example of the third example of the present invention, different CSI-RS resource information may be configured for the APs with different density. For example, all CSI-RS resource information on CSI-RS configuration for Rel. 12 LTE may be separately configured. For example, the CSI-RS resource information includes transmission timing (transmission periodicity and timing offset), CDM, and RE position.

MODIFIED THIRD EXAMPLE

Figure 8A:
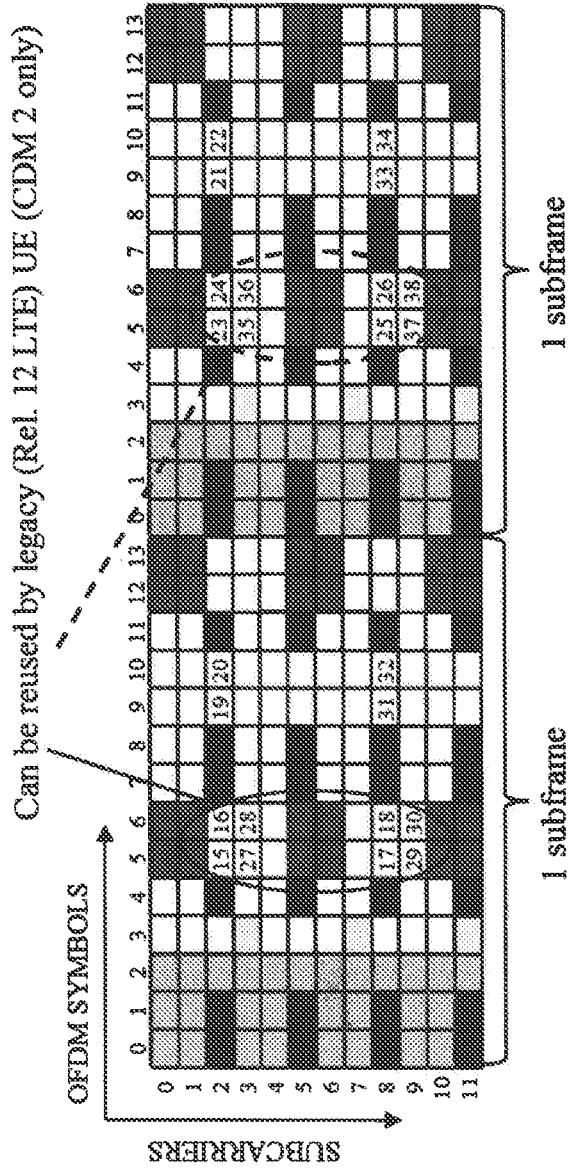
FIG. 8A is a diagram showing a CSI-RS configuration according to one or more embodiments of a modified third example of the present invention.
Figure 8A:
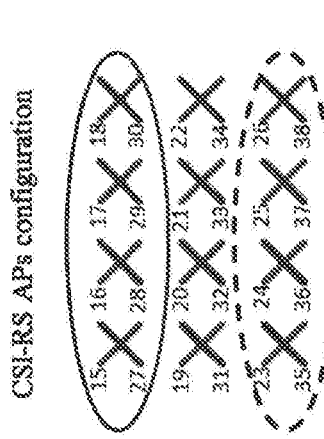

The CSI-RS transmission with the CSI-RS density may affect accuracy of channel estimation in the UE 10 in scenarios of high frequency selectivity and high Doppler in particular. On the other hand, the UE 10 may be allowed to fall back to CSI-RS transmission using smaller number of APs and high CSI-RS density. According to one or more embodiments of a modified third example of the present invention, the CSI-RS APs may be in a plurality of subframes, that is, the CSI-RS APs may be associated with REs in a plurality of subframes. As shown in FIG. 8A for example, REs associated with 24 CSI-RS APs (24-Tx CSI-RS) may be in two subframes. Rel. 12 LTE supports the CSI-RS APs up to 8. Therefore, the legacy (Rel. 12 LTE) UE (or the UE for falling back) can use 8 REs associated with 8-Tx CSI-RS in each subframe. In FIG. 8A, the antenna port numbers {15, 16, 17, 18, 27, 28, 29, 30} represent a 8-Tx cross polarized antenna (CPA) and the antenna port numbers {23, 24, 25, 26, 35, 36, 37, 38} represent another 8-Tx CPA. As a result, even if the BS 20 transmits the CSI-RS using 24-Tx CSI-RS, the legacy (Rel. 12 LTE) can reuse REs with the antenna port numbers {15, 16, 17, 18, 27, 28, 29, 30} in a first subframe and REs with the antenna port numbers {23, 24, 25, 26, 35, 36, 37, 38} in a second subframe.

Figure 8B:
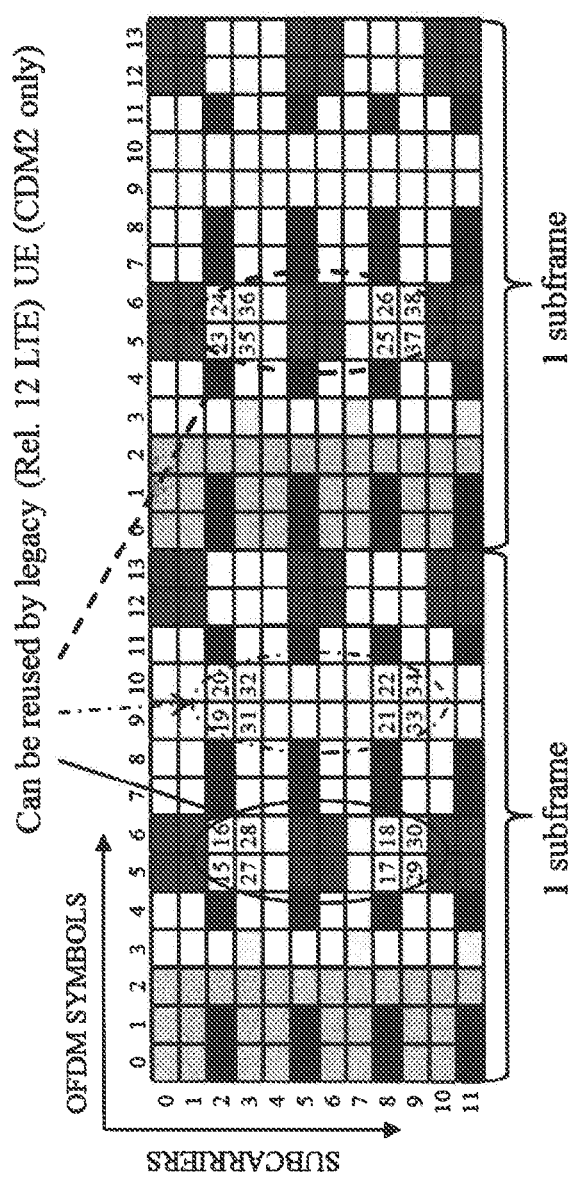
FIG. 8B is a diagram showing a CSI-RS configuration according to one or more embodiments of the modified third example of the present invention.

As shown in FIG. 8B, the antenna port numbers {15, 16, 17, 18, 27, 28, 29, 30}, {19, 20, 21, 22, 31, 32, 33, 34}, and {23, 24, 25, 26, 35, 36, 37, 38} represent different 8-Tx CPA, respectively. The legacy (Rel. 12 LTE) can reuse REs with the antenna port numbers {15, 16, 17, 18, 27, 28, 29, 30} and {19, 20, 21, 22, 31, 32, 33, 34} in a first subframe and REs with the antenna port numbers {23, 24, 25, 26, 35, 36, 37, 38} in a second subframe, even if the BS 20 transmits the CSI-RS using 24-Tx CSI-RS.

Figure 8C:
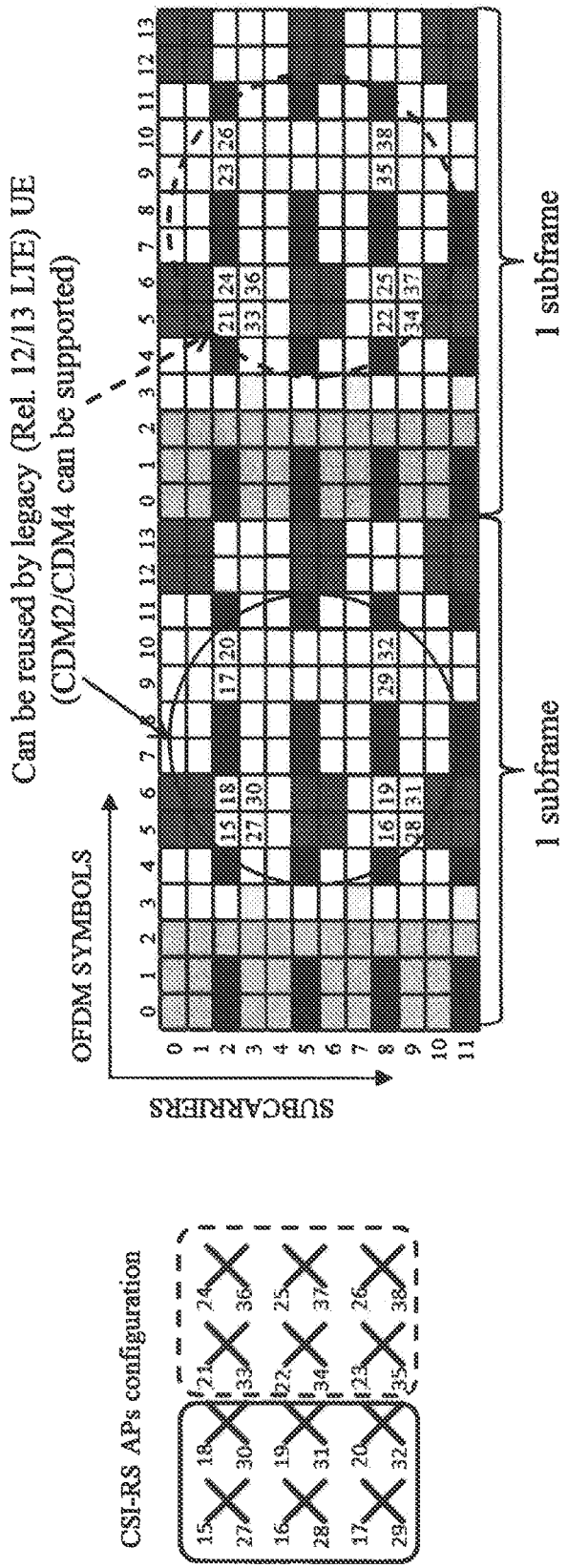
FIG. 8C is a diagram showing a CSI-RS configuration according to one or more embodiments of the modified third example of the present invention.

As shown in FIG. 8C, the antenna port numbers {15, 16, 17, 18, 19, 20, 27, 28, 29, 30, 31, 32} and {21, 22, 23, 24, 25, 26, 33, 34, 35, 36, 37, 38} represent different 8-Tx CPA, respectively. Rel. 12, 13 LTE support the CSI-RS APs up to 8, 16, respectively. The legacy (Rel. 12/13 LTE) can reuse REs with the antenna port numbers {15, 16, 17, 18, 19, 20, 27, 28, 29, 30, 31, 32} in a first subframe and REs with the antenna port numbers {21, 22, 23, 24, 25, 26, 33, 34, 35, 36, 37, 38} in a second subframe, even if the BS 20 transmits the CSI-RS using 24-Tx CSI-RS.

According to one or more embodiments of another example of the third example of the present invention, to consider backwards compatibility with the legacy LTE standard (e.g., Rel. 12/13 LTE), when the BS 20 transmits the CSI-RS over a plurality of subframes, the REs associated with the multiple CSI-RS APs may be disposed within the same subframe.

FOURTH EXAMPLE

Embodiments of a fourth example of the present invention will be described below. According to one or more embodiments of the fourth example of the present invention, the BS 20 may not transmit the CSI-RS from a part of APs.

Figure 9A:
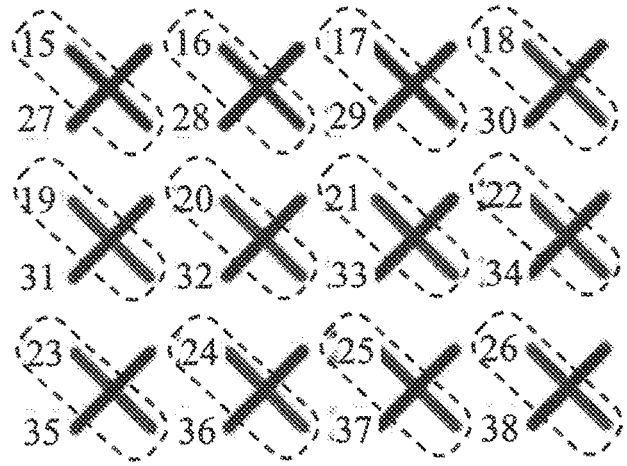
FIG. 9A is a diagram showing a CSI-RS antenna ports configuration according to one or more embodiments of a fourth example of the present invention.

For example, the BS 20 transmits the CSI-RS from only APs having predetermined polarization of the multiple APs, but does not transmit the CSI-RS from the APs having polarization different from the predetermined polarization. FIG. 9A illustrates a configuration of CSI-RS APs (24-Tx CSI-RS). In FIG. 9A, APs of antenna port numbers {15, . . . , 26} have predetermined polarization and APs of antenna port numbers {27, . . . , 38} have polarization different from the predetermined polarization. Therefore, according to one or more embodiments of the fourth example of the present invention, the BS 20 may transmit the CSI-RS from APs of antenna port numbers {15, . . . , 26}, but may not transmit the CSI-RS from APs of antenna port numbers {27, . . . , 38}. Furthermore, for example, the predetermined polarization may be polarization of APs of {27, . . . , 38}. Furthermore, for example, the BS 20 may transmit the CSI-RS from a part of APs having the predetermined.

According to one or more embodiments of another example of the fourth example of the present invention, the BS 20 may transmit the CSI-RS with only APs of which the antenna port number is even (or odd). In an example of the 24-Tx CSI-RS, for example, the BS 20 may transmit the CSI-RS from APs of antenna ports numbers {16, 18, . . . , 38} which are even, but may not transmit the CSI-RS from APs of antenna ports numbers {15, 17, . . . , 37} which are even (or vice versa).

Figure 9B:
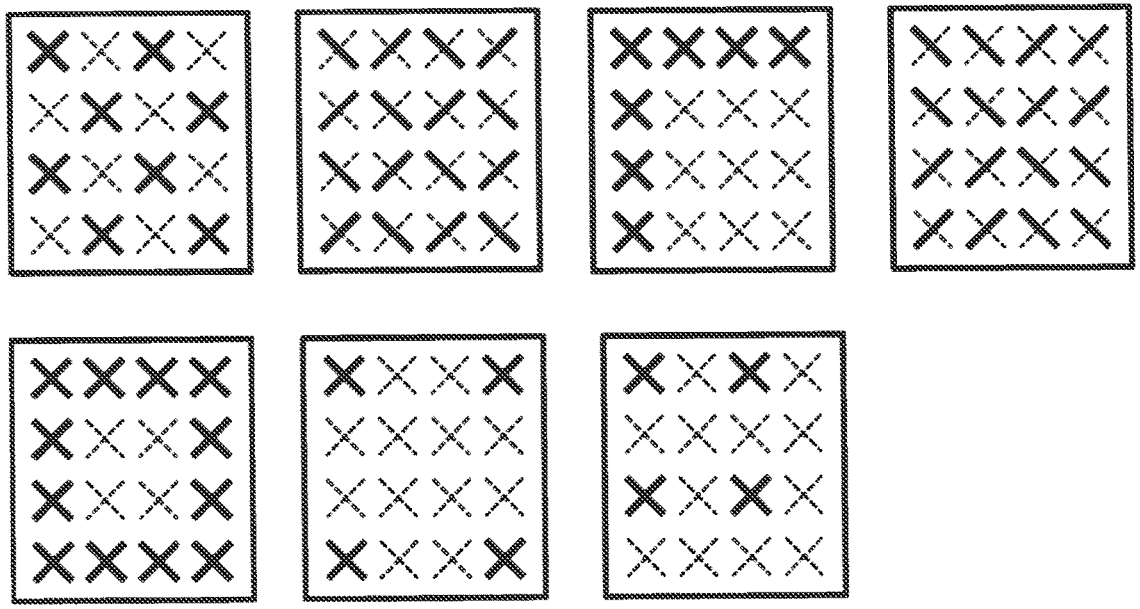
FIG. 9B is a diagram showing a CSI-RS antenna ports configuration according to one or more embodiments of another example of the fourth example of the present invention.

According to one or more embodiments of another example of the fourth example of the present invention, as shown in FIG. 9B, the BS 20 may transmit the CSI-RS with a part of APs, which is sampled in terms of an AP position, polarization, etc. For example, the BS 20 may transmit the CSI-RS from APs selected with respect to the feature of APs such as the AP position and polarization, but may not transmit the CSI-RS from non-selected APs.

As described above, the LTE standard defines the maximum number of REs associated with the CSI-RS APs per subframe as 40 REs. Therefore, the CSI-RS configuration of 20-Tx CSI-RS may use a reuse factor of 2 with 1 RE/RB/port, the CSI-RS configuration of 24, 28 and 32-Tx CSI-RS cannot use a reuse factor of 2 with 1 RE/RB/port. Thus, the method to reduce CSI-RS overhead may be applied for 24, 28 and 32-Tx CSI-RS.

FIFTH EXAMPLE

Embodiments of a fifth example of the present invention will be described below. There is a correlation between the CSI-RS density and accuracy of the channel estimation. According to one or more embodiments of the fifth example of the present invention, the CSI-RS density may be adjusted depending on deployment scenario, traffic, etc. The two or more types of the CSI-RS density may be defined and used in the BS 20 and the UE 10. For example, one type of the CSI-RS density may be high CSI-RS density which is 1 RE/RB/port and another type of density may be low CSI-RS density which is lower than 1 RE/RB/port. For example. The BS 20 may transmit information on the CSI-RS density by higher layer signaling such as RRC signaling.

Figure 10A:
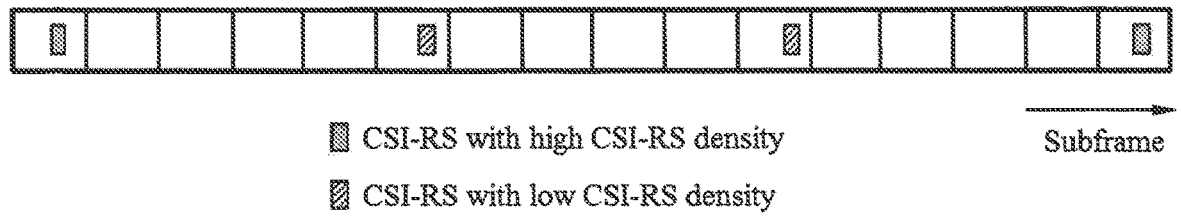
FIG. 10A is a diagram showing CSI-RS transmission with switching CSI-RS density according to one or more embodiments of a fifth example of the present invention.

According to one or more embodiments of the fifth example of the present invention, the BS 20 may transmit the CSI-RS with the low CSI-RS and the high CSI-RS density (e.g., CSI-RS density different from the low CSI-RS density) by dynamically, e.g., subframe and symbol based, switching the low CSI-RS and the different CSI-RS density. As shown in FIG. 10A, the BS 20 may transmit the CSI-RS with high CSI-RS density and then transmit the CSI-RS with low CSI-RS density after predetermined subframes (e.g., 5 ms).

According to one or more embodiments of the fifth example of the present invention, the UE 10 may be configured with transmission periodicity of the CSI-RS with the high CSI-RS density and the low CSI-RS density. Furthermore, the transmission periodicity of the CSI-RS with the high CSI-RS density may be configured with the multiple of low density CSI-RS, or vice versa.

According to one or more embodiments of another example of the fifth example of the present invention, for example, the UE 10 may be configured with CSI-RS configuration (e.g., as in Rel. 12/13 LTE CSI-RS configuration such as RE position, periodicity and timing offset) for each of the CSI-RSs with the low CSI-RS density and high CSI-RS density.

Figure 10B:
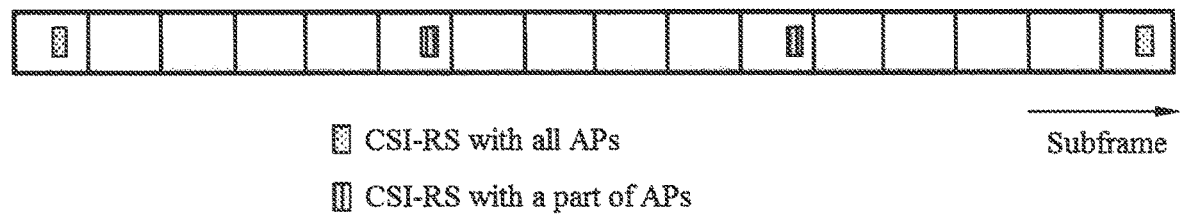
FIG. 10B is a diagram showing CSI-RS transmission with switching CSI-RS antenna ports according to one or more embodiments of another example of the fifth example of the present invention.

According to one or more embodiments of another example of the fifth example of the present invention, the BS 20 may dynamically switch the number of the CSI-RS APs for the CSI-RS transmission. For example, as shown in FIG. 10B, the BS 20 may transmit the CSI-RS with all APs and then transmit the CSI-RS with a part of APs.

Figure 10C:
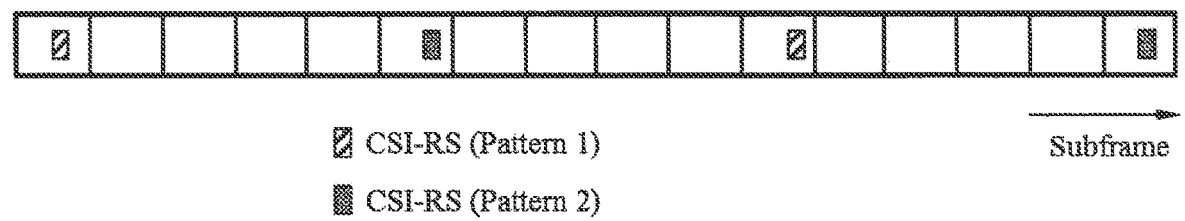
FIG. 10C is a diagram showing CSI-RS transmission with switching the CSI-RS pattern according to one or more embodiments of another example of the fifth example of the present invention.

According to one or more embodiments of another example of the fifth example of the present invention, as shown in FIG. 10C, two or more different CSI-RS transmission patterns may be switched. For example, the different pattern may be different APs and different CSI-RS density (for each AP).

Figure 10D:
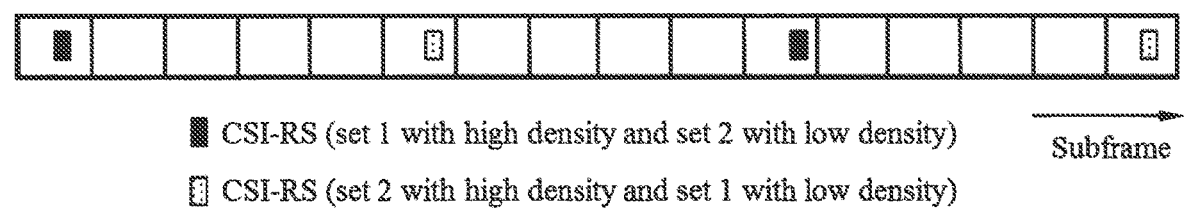
FIG. 10D is a diagram showing CSI-RS transmission with switching the CSI-RS density according to one or more embodiments of another example of the fifth example of the present invention.

According to one or more embodiments of another example of the fifth example of the present invention, as shown in FIG. 10D, the CSI-RS including set 1 with high CSI-RS density and set 2 with low CSI-RS density and the CSI-RS including set 2 with high CSI-RS density and set 1 with low CSI-RS density may be switched.

According to one or more embodiments of another example of the fifth example of the present invention, for aperiodic CSI-RS triggering, the BS 20 may dynamically switch the CSI-RS multiplexing. It may be signaled in terms of the CSI-RS density, AP, polarization, CSI-RS set, etc. The signaling can be configured either or both of higher and lower layer signaling.

The above examples show switching technology in the time domain, but it can be utilized in the frequency domain or code domain, i.e., CDM. For example, the CSI-RS transmission pattern can be switched for each RB. It can be jointly applied, e.g., combination of TDM and FDM.

SIXTH EXAMPLE

Embodiments of a fourth example of the present invention will be described below. Existing APs for reuse index up to 30 (15-30). Additional ports may be indexed as follows:

Alt. 1:

$$p = \begin{cases} p' + \frac{N_P}{2}i & \text{for } p' \in \{15, \ldots, 15 + N_P/2 - 1\} \\ p' + \frac{N_P}{2}(i + N_R - 1) & \text{for } p' \in \{15 + N_P/2, \ldots, 15 + N_P - 1\} \end{cases} \quad \text{Equation 1}$$

where i is the index of the resource; p' is the antenna port number within the CSI-RS configuration; $N_P$ is the number of CSI-RS antenna ports per CSI-RS configuration; $N_R$ is the number of CSI-RS configurations.

Alt. 2:

$$p = iN_P + p' \quad \text{Equation 2}$$

Alt. 3: for CDM-2 and 1 RE/port/RB, Alt. 1 is used; for other cases, Alt. 2 is used.

If a CSI-RS configuration for Rel. 14 LTE is configured by the CSI-RS configurations for Rel. 13 LTE (due to RRC signaling design), the following aspects can apply:

Alt. 1: apply the above equation assuming p' is according to Rel. 13 LTE numbering.

Example: 24 APs for Rel. 14 LTE=2×12 APs for Rel. 12 LTE. As a result, $N_P$=12; $N_R$=2.

Alt. 2: it shall first present CSI-RS configuration for Rel. 14 LTE by aggregating the CSI-RS configurations of Rel. 12 LTE, then apply the above equation assuming p' is according to Rel. 12 LTE numbering.

Example 1: 24 APs for Rel. 14 LTE=2×12 APs for Rel. 13 LTE=6×4 APs for Rel. 11 LTE. As a result, $N_P$=4, $N_R$=6.

Example 2: 24 APs for Rel. 14 LTE=2×12 APs for Rel. 13 LTE=3×8 APs for Rel. 11 LTE. As a result, $N_P$=8, $N_R$=3.

(Configuration of Base Station)

The BS 20 according to one or more embodiments of the present invention will be described below with reference to the FIG. 11.

Figure 11:
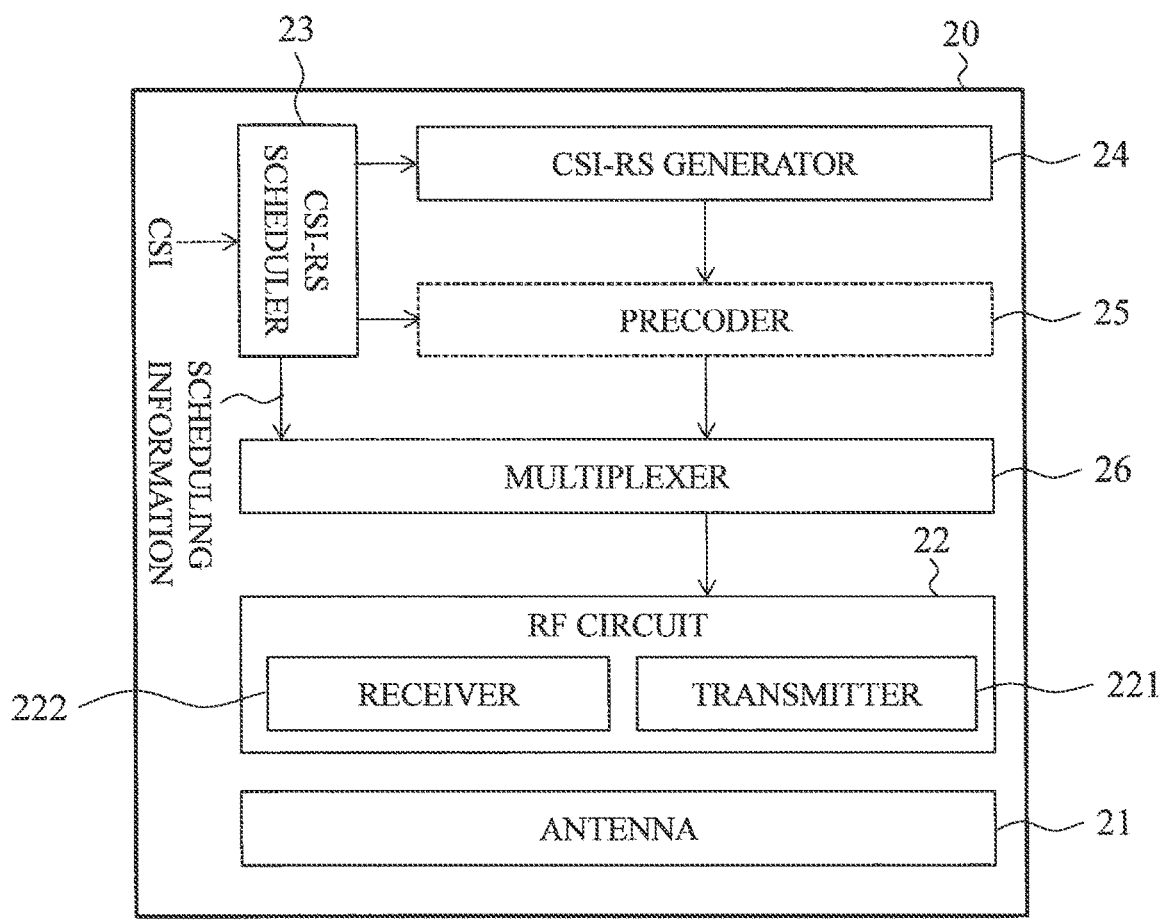
FIG. 11 is a functional block diagram of a base station according to one or more embodiments of the present invention.

As shown in FIG. 11, the BS 20 may comprise an antenna 21 for FD-MIMO, a Radio Frequency (RF) Circuit 22, a CSI-RS scheduler 23, a CS-RS generator 24, a precoder 25, and a multiplexer 26. The RF circuit 22 includes a transmitter (TXRU) 221 and a receiver 222.

The antenna 21 may comprise a multi-dimensional antenna that includes multiple antenna elements such as a 2D antenna (planar antenna) or a 3D antenna such as antennas arranged in a cylindrical shape or antennas arranged in a cube. The antenna 21 includes antenna ports having one or more antenna elements. The beam transmitted from each of the antenna ports is controlled to perform MIMO communication with the UE 10.

The antenna 21 allows the number of antenna elements to be easily increased compared with linear array antenna. MIMO transmission using a large number of antenna elements is expected to further improve system performance. For example, with the beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

The RF circuit 22 generates input signals to the antenna 21 and performs reception processing of output signals from the antenna 21.

The transmitter 221 included in the RF circuit 22 transmits data signals (for example, reference signals and precoded data signals) via the antenna 21 to the UE 10. The transmitter 221 transmits CSI-RS resource information that indicates a state of the determined CSI-RS configurations (for example, subframe configuration ID and mapping information) to the UE 20 via higher layer signaling or lower layer signaling. The transmitter 221 transmits the CSI-RS allocated to the determined CSI-RS configurations to the UE 10.

The receiver 222 included in the RF circuit 22 receives data signals (for example, reference signals and the CSI feedback information) via the antenna 21 from the UE 10.

The CSI-RS scheduler 23 determines CSI-RS configurations allocated to the CSI-RS. For example, the CSI-RS scheduler 23 determines a CSI-RS subframe that includes the CSI-RS in subframes. The CSI-RS scheduler 23 determines at least an RE that is mapped to the CSI-RS.

The CSI-RS generator 24 generates CSI-RS for estimating the downlink channel states. The CSI-RS generator 24 may generate reference signals defined by the LTE standard, dedicated reference signal (DRS) and Cell-specific Reference Signal (CRS), synchronized signals such as Primary synchronization signal (PSS) and Secondary synchronization signal (SSS), and newly defined signals in addition to CSI-RS.

The precoder 25 determines a precoder applied to the downlink data signals and the downlink reference signals. The precoder is called a precoding vector or more generally a precoding matrix. The precoder 25 determines the precoding vector (precoding matrix) of the downlink based on the CSI indicating the estimated downlink channel states and the decoded CSI feedback information inputted.

The multiplexer 26 multiplexes CSI-RS on REs based on the determined CSI-RS configurations by the CSI-RS scheduler 23.

The transmitted reference signals may be Cell-specific or UE-specific. For example, the reference signals may be multiplexed on the UE-specific signal such as PDSCH, and the reference signal may be precoded. By notifying a transmission rank of reference signals to the UE 10, estimation for the channel states may be realized at the suitable rank according to the channel states.

(Configuration of User Equipment)

The UE 10 according to one or more embodiments of the present invention will be described below with reference to the FIG. 12.

Figure 12:
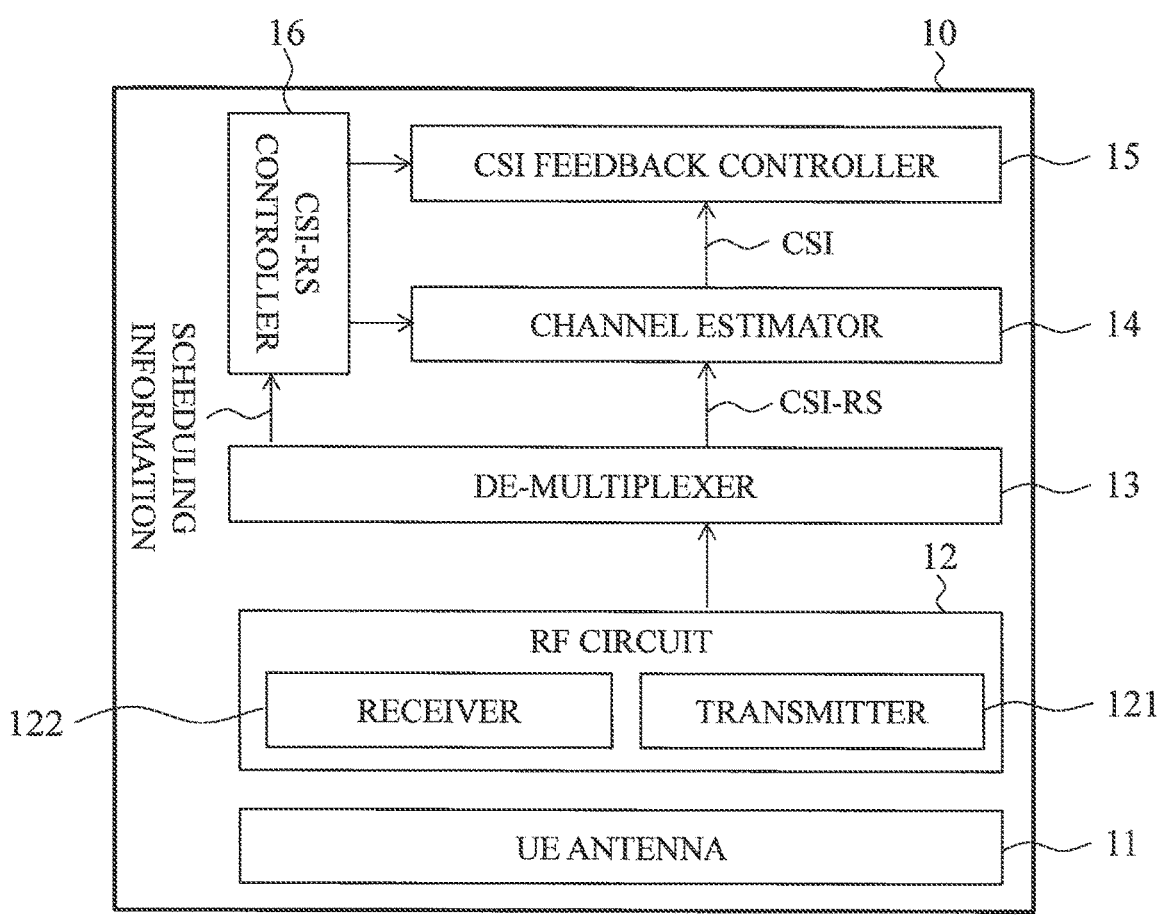
FIG. 12 is a structure diagram of an example of a UE according to one or more embodiments of the present invention.

As shown in FIG. 12, the UE 10 may comprise a UE antenna 11 used for communicating with the BS 20, an RF circuit 12, a de-multiplexer 13, a channel estimator 14, CSI feedback controller 15, and a CSI-RS controller 16. The RF circuit 12 includes a transmitter 121 and a receiver 122.

The transmitter 121 included in the RF circuit 12 transmits data signals (for example, the CSI feedback information) via the UE antenna 11 to the BS 20.

The receiver 122 included in the RF circuit 12 receives data signals (for example, reference signals such as CSI-RS) via the UE antenna 11 from the BS 20.

The de-multiplexer 13 separates a PDCCH signal from a signal received from the BS 20.

The Channel estimator 14 estimates downlink channel states based on the CSI-RS transmitted from the BS 20, and then outputs a CSI feedback controller 15.

The CSI feedback controller 15 generates the CSI feedback information based on the estimated downlink channel states using the reference signals for estimating downlink channel states. The CSI feedback controller 15 outputs the generated CSI feedback information to the transmitter 121, and then the transmitter 121 transmits the CSI feedback information to the BS 20. The CSI feedback information may include at least one of Rank Indicator (RI), PMI, CQI, BI and the like.

The CSI-RS controller 16 determines whether the specific user equipment is the user equipment itself based on the CSI-RS resource information when UE-specific CSI-RS is transmitted from the BS 20. When the CSI-RS controller 16 determines that the specific user equipment is the user equipment itself, the transmitter that CSI feedback based on the CSI-RS to the BS 20.

OTHER EXAMPLES

Although the present disclosure mainly described examples of downlink transmission, the present invention is not limited thereto. One or more embodiments of the present invention may also apply to uplink transmission.

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A and a newly defined channel and signaling scheme.

The above examples and modified examples may be combined with each other, and various features of these examples can be combined with each other in various combinations. The invention is not limited to the specific combinations disclosed herein.

In one or more embodiments of the present invention, an example will be described that the BS 20 includes planar antenna, but the present invention is not limited thereto. In the present invention, the BS 20 may include a one-dimensional antenna or a predetermined three-dimensional antenna.

In one or more embodiments of the present invention, an example will be described that the 40 REs per subframe is associated with the CSI-RS APs according to the conventional LTE standard, but the present invention is not limited thereto. In the present invention, the number of REs associated with the CSI-RS APs may be more than 40 or a part of 40 REs.

Although the present disclosure mainly described examples of 20, 24, 28, 32-Tx CSI-RS, the present invention is not limited thereto. One or more embodiments of the present invention may also apply to the predetermined number of CSI-RS APs.

Although the present disclosure mainly described with examples with high CSI-RS density of 1 RE/RB/port and low CSI-RS density with 0.5 RE/RB/port, the present invention is not limited the number.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
11 UE antenna
12 RF circuit
121 Transmitter
122 Receiver 13 DE Multiplexer
14 Channel estimator
15 CSI feedback controller
16 CSI-RS controller
20 Base station (BS)
21 Antenna
22 RF circuit
221 Transmitter
222 Receiver
23 CSI-RS scheduler
24 CSI-RS generator
25 Precoder
26 Multiplexer

What is claimed is:

1. A terminal comprising:
a processor; and
a receiver that receives Channel State Information Reference Signals (CSI-RSs), transmitted from a base station (BS), using 24 antenna ports (APs) or 32 APs,
wherein a first CSI-RS configuration for the 24 APs or 32 APs is configured by aggregating a predetermined number of second CSI-RS configurations,
wherein a number of APs per each of the second CSI-RS configurations is 2, 4, or 8,
wherein the receiver receives the CSI-RSs with predetermined CSI-RS density,
wherein the predetermined CSI-RS density is defined as resource elements (REs) mapped to the CSI-RS s of each of the APs per resource block (RB), and
wherein the receiver receives the predetermined CSI-RS density from the BS using Radio Resource Control (RRC) signaling.

2. The terminal according to claim 1, wherein when the receiver receives the CSI-RSs using 24 APs, the number of APs per each of the second CSI-RS configurations and the predetermined number are 2 and 12, 4 and 6, or 8 and 3, respectively.

3. The terminal according to claim 1, wherein when the CSI-RSs are transmitted using the 32 APs, the number of APs per each of the second CSI-RS configurations and the predetermined number are 2 and 16, 4 and 8, or 8 and 4, respectively.

4. The terminal according to claim 1, wherein a value of the predetermined CSI-RS density is 0.5.

5. The terminal according to claim 1, wherein the REs mapped to the CSI-RS s are allocated in odd or even RBs in a frequency domain.

6. A wireless communication method for a terminal comprising:
receiving Channel State Information Reference Signals (CSI-RSs), transmitted from a base station (BS), using 24 antenna ports (APs) or 32 APs,
wherein a first CSI-RS configuration for the 24 APs or the 32 APs is configured by aggregating a predetermined number of second CSI-RS configurations,
wherein a number of APs per each of the second CSI-RS configurations is 2, 4, or 8,
wherein the CSI-RSs are received with a predetermined CSI-RS density,
wherein the predetermined CSI-RS density is defined as resource elements (REs) mapped to the CSI-RSs of each of the APs per resource block (RB), and
wherein the predetermined CSI-RS density is received from the BS using Radio Resource Control (RRC) signaling.

7. A base station (BS) comprising:
a processor; and
a transmitter that transmits, to a terminal, Channel State Information Reference Signals (CSI-RSs) using 24 antenna ports (APs) or 32 Aps,
wherein a first CSI-RS configuration for the 24 APs or the 32 APs is configured by aggregating a predetermined number of second CSI-RS configurations,
wherein a number of APs per each of the second CSI-RS configurations is 2, 4, or 8,
wherein the transmitter transmits the CSI-RS s with predetermined CSI-RS density,
wherein the predetermined CSI-RS density is defined as resource elements (REs) mapped to the CSI-RSs of each of the APs per resource block (RB), and
wherein the transmitter transmits the predetermined CSI-RS density to the terminal using Radio Resource Control (RRC) signaling.

8. A system comprising a base station (BS) and a terminal, wherein:
the base station comprises:
a first processor; and
a transmitter that transmits, to a terminal, Channel State Information Reference Signals (CSI-RSs) using 24 antenna ports (APs) or 32 APs, and
the terminal comprises:
a second processor; and
a receiver that receives the CSI-RSs,
wherein a first CSI-RS configuration for the 24 APs or 32 APs is configured by aggregating a predetermined number of second CSI-RS configurations,
wherein a number of APs per each of the second CSI-RS configurations is 2, 4, or 8,
wherein the receiver receives the CSI-RSs with predetermined CSI-RS density,
wherein the predetermined CSI-RS density is defined as resource elements (REs) mapped to the CSI-RSs of each of the APs per resource block (RB), and
wherein the receiver receives the predetermined CSI-RS density from the BS using Radio Resource Control (RRC) signaling.

* * * * *